United States Patent [19]

Katsuragi et al.

[11] Patent Number: 4,808,896
[45] Date of Patent: Feb. 28, 1989

[54] CONTROL DEVICE FOR HEATING DEEP-SEA ELECTRIC MOTOR OIL

[75] Inventors: Yoshio Katsuragi; Hatsuo Ohta, both of Nagasaki, Japan

[73] Assignee: Mitsubishi Denki Kabushiki Kaisha, Tokyo, Japan

[21] Appl. No.: 172,151

[22] Filed: Mar. 22, 1988

[30] Foreign Application Priority Data

Mar. 23, 1987 [JP]  Japan ................................. 62-69401

[51] Int. Cl.$^4$ ............................................. H02P 7/40
[52] U.S. Cl. ..................................... 318/436; 318/798; 417/366
[58] Field of Search ............... 318/436, 430, 431, 798, 318/806, 778; 184/6.3, 6.22; 417/366; 310/87

[56] References Cited

U.S. PATENT DOCUMENTS

| | | | |
|---|---|---|---|
| 3,704,078 | 11/1972 | Conery et al. | 310/87 |
| 4,195,324 | 3/1980 | Waltz | 318/436 |
| 4,638,643 | 1/1987 | Sakazume et al. | 318/436 |

Primary Examiner—David Smith, Jr.
Attorney, Agent, or Firm—Sughrue, Mion, Zinn, Macpeak and Seas

[57] ABSTRACT

A control device monitors the elapsed off time of an oil filled deep sea electric motor 4, and compares this with a calculated time for the oil temperature to drop to a predetermined value at a sensed water depth. When the two times are equal a low, heating current is supplied to the primary winding 11 to prevent the oil from becoming more viscous. The heating current is insufficient to rotate the motor armature, and its intensity is increased with depth corresponding to the decrease of the water temperature with depth.

5 Claims, 1 Drawing Sheet

CONTROL DEVICE FOR HEATING DEEP-SEA ELECTRIC MOTOR OIL

BACKGROUND OF THE INVENTION

This invention relates to a control device for a sealed, oil insulated electric motor installed in a deep-sea submarine or the like, and particularly to a control device for maintaining the oil at a predetermined temperature during idle periods to thereby reduce the startup torque and current drain due to the otherwise viscous nature of the cold oil.

Generally, in deep-sea work boats, research vessels or the like which submerge to depths of thousands of meters, various electric motors are installed for use in the propulsion of the main and auxiliary engines, sea-water pumps, hydraulic pumps, etc.

FIG. 1 illustrates one such motor, configured as a three-phase AC induction motor 4, having a primary winding 11 wound around a stator core 42 provided on the inner periphery of a frame 41. Oil lubricated ball or roller bearings 43 are mounted at the ends of the motor to rotatably support a shaft 44 mounting a rotor core 45. A shaft seal 46 is installed at one end of the motor. Installed at the other end of the motor is an equalizing device 47 for equalizing the pressure inside the motor 4 to the outside pressure of the surrounding sea water upon submergence. The equalizing device 47 comprises an expandable bellows 48, a tension spring 49, and a support plate 50. The motor frame 41 is filled and sealed with oil 51, which is both electrically insulating and lubricating.

Such oil has increasing viscosity and deteriorating fluidity with a decrease in temperature or an increase in pressure.

When a vessel submerges the pressure of the sea water is applied to the interior A of the bellows 48, and the pressure of the oil 51 inside the motor 4 can thus mount to hundreds of atmospheres at a temperature of about 1°-2° C. when the motor is not operating (i.e., cold state).

When the vessel submerges to great depths the oil inside the idle motor is thus at a low temperature and under high pressure, and as a result the motor is difficult to start again because of the large opposition torque due to the high viscosity of the oil. To operate under such conditions it is necessary to employ an unduly large motor having a high starting torque capable of overcoming such factors as the static frictional force of the machine to be driven, the high pressure due to the depth of submergence, and the viscous resistance of the low temperature oil. The motor output is thus excessive under normal or running conditions.

SUMMARY OF THE INVENTION

The invention overcomes this problem by providing a control device which supplies a low current to the primary winding of the motor to heat the oil and thus reduce its opposition torque at startup time. The control device monitors the elapsed off time of the motor, and compares this with a calculated time for the oil temperature to drop to a predetermined value at a sensed water depth. When the two times are equal the low current is supplied to the primary winding to prevent the oil from becoming more viscous.

DETAILED DESCRIPTION OF THE PREFERRED EMBODIMENT

Figure 1:
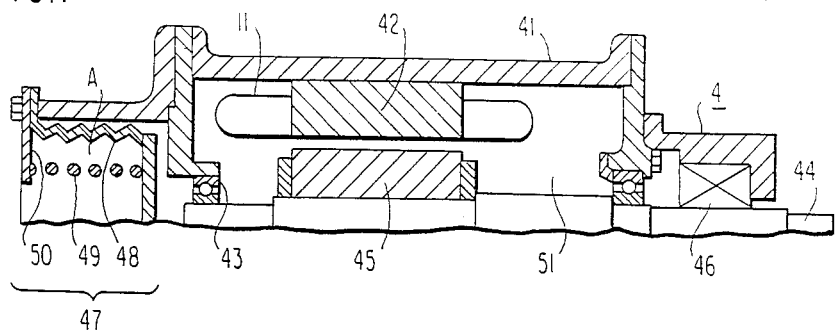
FIG. 1 is a partial cross-sectional view illustrating the essential components of a deep-sea electric motor.
Figure 2:
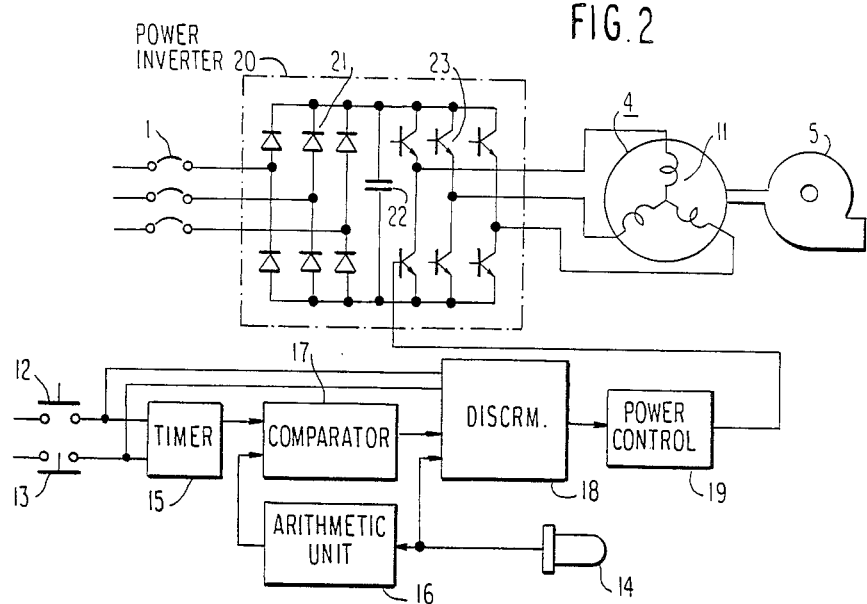
FIG. 2 is a circuit diagram illustrating a control device for the motor according to the invention.

Referring to FIG. 2, the input side of a power inverter 20 is connected to an AC power source through breakers or fuses 1, and the output side thereof is connected to the motor 4 to drive a load 5 such as a pump. The inverter includes a diode rectifier section 21, a capacitive smoothing section 22, and a power transistor converting section 23 for supplying a variable voltage and frequency signal to the primary winding 11 of the motor 4.

Further components include a start push-button 12, a stop push-button 13, a pressure detector 14 for detecting the pressure of the sea water, a timer 15, an arithmetic unit 16, a comparator 17, a signal discrimination circuit 18, and a power control circuit 19. The timer 15 is initiated by the motor stop signal and counts the time elapsed after stopping; it is reset to zero when a start signal is received. The arithmetic unit 16 calculates the estimated time for the oil temperature to drop to a predetermined value as a function of the detected pressure equals depth. It comprises a known microcomputer and has a memory. The comparator 17 outputs a signal when the elapsed time after stopping counted by the timer 15 equals the time calculated by the arithmetic unit 16.

The signal discrimination circuit 18 responds to the motor start signal by outputting an operation mode signal, and responds to an output signal from the comparator 17 by outputting a heating mode signal at a specified intensity corresponding to the pressure of the sea water detected by the pressure detector 14. The motor stop signal is also supplied to the discrimination circuit 18.

The power control circuit 19 receives the various mode signals from the discrimination circuit 18, and ignites the control electrodes (base terminals) of the power transistors 23 for a predetermined time in accordance with each mode signal. The output of the power control circuit 19 is supplied to all of the transistors 23, although the drawing shows only trigger connection.

In operation, the start signal outputted by depressing the push-button 12 causes the signal discrimination circuit 18 to output an operation mode signal, in response to which the power control circuit 19 outputs an ignition signal to the control electrodes of the transistor 23 which applies a rated voltage to the primary winding 11 of the motor 4. The motor then generates a sufficient starting torque to overcome the load torque and opposition torque applied to the rotor due to the viscous resistance of the oil 51, and soon reaches a rated speed.

When the motor is stopped by depressing the stop button 13, the timer 15 is initiated and outputs an elapsed time signal to the comparator 17.

When the vessel is under water and the motor is stopped, the temperature of the oil 51 sealed inside the motor gradually drops from its relatively high operational temperature with the passage of time. The temperature of the sea water decreases with depth as shown by curves B (several hundred meters), C (about one thousand meters) and D (several thousand meters) in FIG. 3, for example, and the temperature drop rate of the motor oil is thus accelerated with increasing submergence depth.

Figure 3:
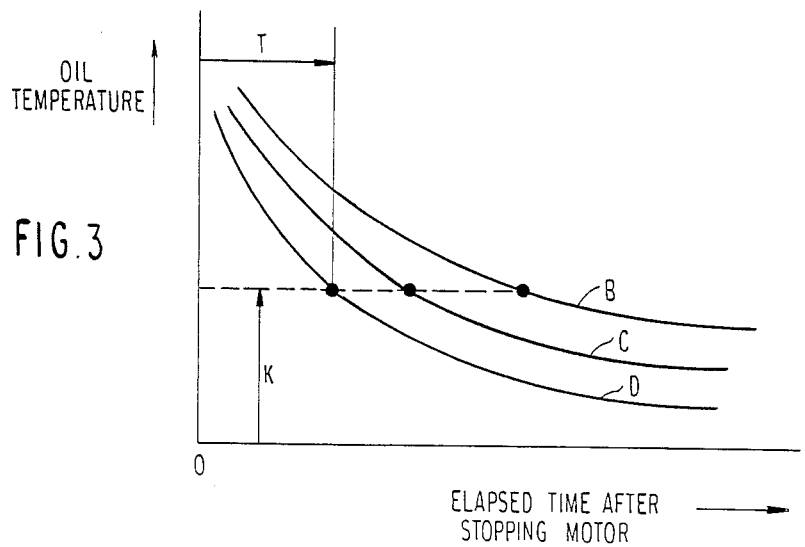
FIG. 3 is a diagram illustrating temperature drop vs. time characteristics for the oil sealed in the motor after its operation is stopped.

The arithmetic unit 16 comprises a microcomputer, and a formula expressing the oil temperature drop curve(s) as a function of the sea water pressure as illustrated in FIG. 3 is incorporated in the memory thereof in order to calculate the time for the oil temperature to drop to a specified temperature K after the motor is stopped. If the depth is D, for example, then the calculated time for a temperature drop to K is T. When the time elapsed after stopping the motor counted by the timer 15 is coincident with the time T, a signal is outputted from the comparator circuit 17. Upon receiving this signal, the discrimination circuit 18 outputs a heating mode signal corresponding to the pressure of the sea water detected by the pressure detector 14.

The power control circuit 19, upon receiving the heating mode signal, outputs an ignition signal to the control electrodes of the transistors 23 with a periodicity corresponding to the intensity of the heating mode signal. As a result, a voltage proportional to the pressure of the sea water and lower than the rated startup voltage is applied to the primary winding 11 from the transistors 23, and the oil 51 is thus heated by the winding and kept at a required temperature ready for the next operation. The voltage applied is increased with an increase of the submergency depth (pressure of sea water) to keep the oil temperature approximately constant. The intensity of heating mode signal, corresponding to the pressure of the sea water, is selected in the signal discrimination circuit 18.

When a start signal is outputted by depressing the button 12, the timer 15 is reset and the discrimination circuit 18 outputs an operation mode signal whereupon the voltage supplied from the power circuit to the primary winding 11 is switched from the low voltage to the rated voltage.

The oil heating voltage applied to the winding at the time of stopping the motor is no more than one fifteenth (1/15) to one twentieth (1/20) of the rated voltage, which is insufficient to rotate the motor.

What is claimed is:

1. A control device for an electric motor (4) installed in a submersible vessel and filled with oil (51) exposed to external sea water pressure, comprising:
   (a) a power circuit (20) for supplying variable power to a primary winding (11) of said motor;
   (b) a pressure detector (14) for detecting the sea water pressure when said vessel is submerged;
   (c) a timer (15) for counting time elapsed after stopping said motor;
   (d) an arithmetic unit (16) responsive to an input signal from said pressure detector for calculating the time required for the temperature of the oil to drop to a predetermined value (K) corresponding to the sea water pressure when the motor is stopped;
   (e) a comparator circuit (17) for comparing the time calculated by said arithmetic unit and the time counted by said timer, and for outputting a signal when the two times are coincident;
   (f) a signal discrimination circuit (18) for outputting a heating mode signal in response to inputs from said pressure detector and said comparator circuit; and
   (g) a power control circuit (19) responsive to an input from the signal discrimination circuit for causing sufficient power to be supplied to said primary winding of the motor to maintain the oil at said predetermined temperature value and thereby facilitate a subsequent motor startup by preventing the oil from becoming more viscous.

2. A control device according to claim 1, wherein the timer is reset to zero upon motor startup.

3. A control device according to claim 1, wherein the discrimination circuit selects a higher heating mode signal with an increase of the sea water pressure detected by said pressure detector.

4. A control device according to claim 1, wherein the heating mode output signal of the discrimination circuit is enabled by a motor stop signal.

5. A control device according to claim 1, wherein the power circuit includes an inverter (23) to which an ignition signal is supplied from the power control circuit corresponding to the intensity of the heating mode signal from the signal discrimination circuit, said power circuit applying a voltage lower than a rated operational voltage and insufficient to generate a rotational torque in the motor.

* * * * *